United States Patent

Soderstrom et al.

[15] 3,670,146

[45] June 13, 1972

[54] SIGNAL CONVERTER

[72] Inventors: Gill Gunnar Soderstrom, Rorstrandsgatan 37, Stockholm; Bertil Nilsson, Pettersbergsvagan 86, Hagersten; Nils Evert Johan Stahl, Hjortstigen 18, Stocksund, all of Sweden

[22] Filed: Dec. 4, 1969

[21] Appl. No.: 882,752

[52] U.S. Cl. ................................235/61.11 D, 340/174.1 H

[51] Int. Cl. ........................................G06k 7/08, G11b 5/00

[58] Field of Search ..............235/61.11 R, 61.11 D, 61.11 E; 340/174.1 G, 174.1 H; 178/62, 65, 79

[56] References Cited

UNITED STATES PATENTS

| | | | |
|---|---|---|---|
| 2,813,259 | 11/1957 | Burkhart | 340/174 |
| 2,864,078 | 12/1958 | Seader | 340/174 |
| 3,445,635 | 5/1969 | Trickett et al. | 235/61.11 R |

*Primary Examiner*—Daryl W. Cook
*Attorney*—Hammond & Littell

[57] ABSTRACT

In a signal converter for reading of information recorded on a magnetic tape and for conversion of said information to a language suitable for punched tape, data tape, data communication or the like, the magnetic tape comprising two information-carrying channels, one of which contains digit bits and the other the corresponding inverse digit bits, and each digit having a control bit which starts the digit, and the signal converter comprising a magnetic tape reader for successive reading of the bits in the information-carrying channels, a digit store with a number of locations for parallel storage of a digit, which number corresponds to the number of digit bits per digit, a code transformer for re-coding the stored information to the suitable language, and a reading unit for the release of each one of the digits thus re-coded, the improvement which resides in that the signal converter includes 1. a synchronizing chain connected between the reader and the digit store and provided with a starting step,
2. a number of intermediate steps corresponding to the number of digit bits per digit, and
3. an end step, where the control bit, which is simultaneously recorded in both channels mentioned, is arranged partly to re-set the chain and partly to 1-set the first intermediate step of said chain when reading the first digit bit, said digit bits and said inverse digit bits being arranged to successively 1-set the successive steps of the chain, and 4. a number of gates corresponding the number of intermediate steps with an input connected to the corresponding intermediate step and another input connected for being fed from the channel containing the digit bits, so that each respective gate is opened for each digit bit in order to transmit said bit to the location in the digit store which corresponds to its position.

7 Claims, 1 Drawing Figure

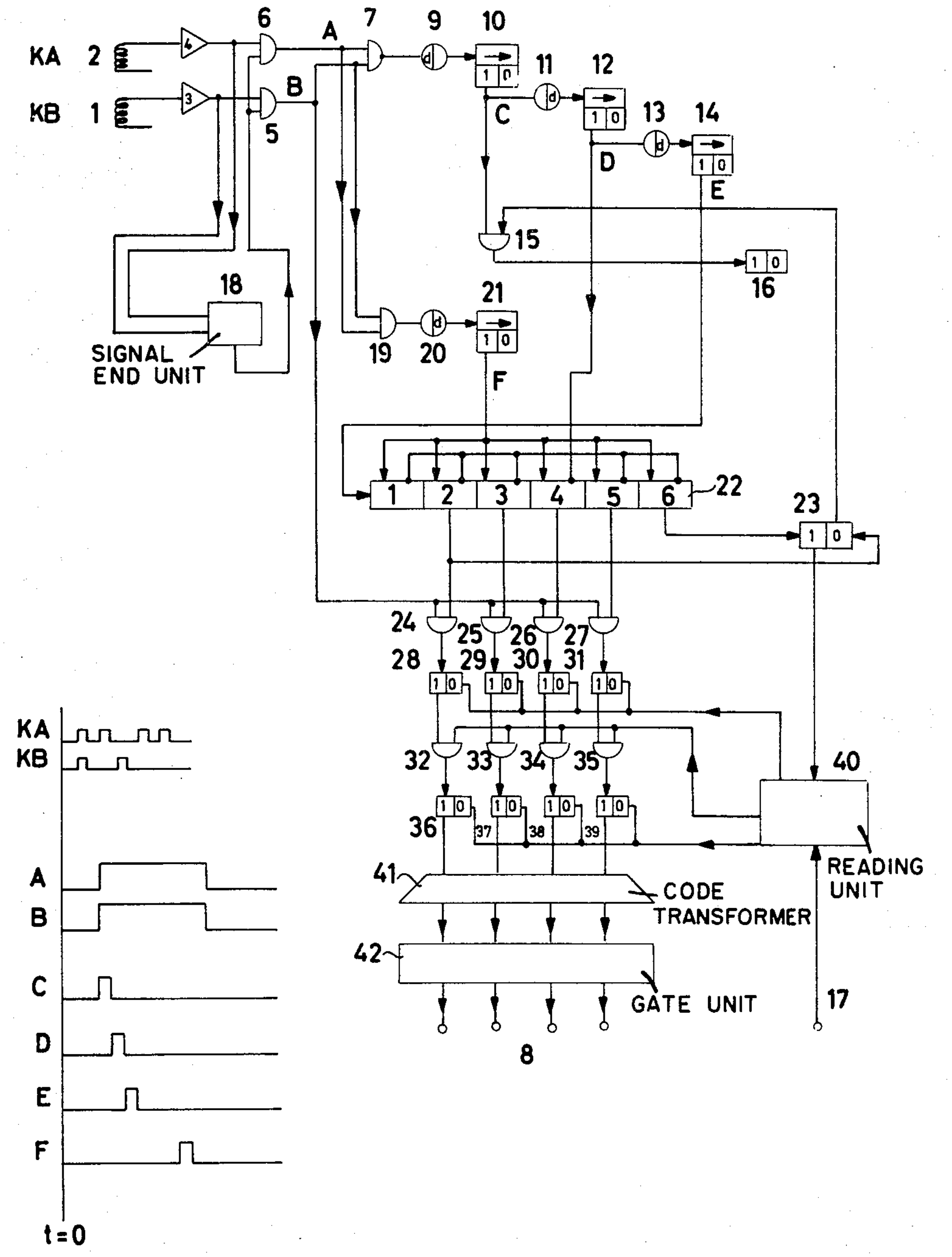
INVENTORS
GILL GUNNAR SÖDERSTRÖM
BERTIL NILSSON,
NILS EVERT JOHAN STÅHL
BY
Hammond & Littell
ATTORNEYS

SIGNAL CONVERTER

The present invention relates to a signal converter for reading information recorded on magnetic tape and conversion of said information to a language suitable for punched tape, data tape, data communication, etc. The signal converter has been developed in connection with portable ticket vending machines, in which the magnetic tape is contained (housed) in a cartridge magazine and shall be used for converting of data which have been automatically recorded on the tape during the operation of the ticket vending machine in connection with a ticket sales transaction. The tape mentioned has two information carrying channels, one of which containing code element bits and the other one containing inverse code element bits. However, the application of the invention is of course not limited to such ticket vending machines only, but it can also be used whenever one desires to carry out a conversion of data recorded on magnetic tape to data on identical or different type of information carrying means in a different code built up for use in central computer installations.

It is an object of the invention to make possible the collection of data at the data source and to provide the storage of the data in a simple manner in a removable cartridge magazine unit and further to use the data stored in said unit in a reader, such as a reader in a central installtion, without any intermediate step involving manual processing of the data being required. As mentioned above, the source of the data may, for example, be a ticket vending machine used by transportation enterprises, and by insertion of its storage cartridge magazine unit in the signal converter of a central installation, its stored record can be processed, the recorded information on the magnetic tape being read and converted to a language suitable for processing in a computer of said central installation, which, by way, of example can supply information for statistical purposes, such as to traffic conditions related to different vehicles of the transportation enterprise. It is evident that one also can employ the invention, for example, in individual cash registers of a department store, in recording of the movements of goods in the stores of workshops, in connection with lumber measuring operations in the forestry trade, and in many other applications.

In applications of the kind described above it is very difficult in practice to obtain a constant speed of the magnetic tape during the registration of the information thereon at the data source, such as the ticket vending machine, this being a common requirement when using known signal converters for the conversion of information recorded in a certain code on the magnetic tape to another code language, which is suitable for use in a data processing device, such as a computer.

The invention makes it possible to omit said common requirement of the magnetic tape having a constant speed during the recording of the information, in that a special control bit is introduced in the digit code employed, said control bit differing from the digit bits by being registered in an identical manner in both the information channels. The control bit is suitably employed as a starting signal for the processing of the respective digits in the signal converter. Since the code is itself composed of bits and non-bits respectively, in the same bit position in both the channels, the invention in addition, makes the code self checking.

The signal converter in accordance with the present invention comprises a code bit reader; in the example described below it is a magnetic reader for reading of magnetic tape with four digit bits and two channels and with a control bit in the form of a starting signal. The converter further comprises a digit store, where the digits read are stored in a suitable language for the subsequent use. The converter still further comprises a suitable code translator and means for reading control, controlled by the computer or the like, to which the information from the signal converter shall be fed.

The control bit, such as a starting signal, is identified by an identifying device and sets a synchronizing device in a starting position, from where said device is given a stepwise forward feed by each digit bit, and inverse digit bit respectively. The synchronizing chain is connected with a storage device, from where the data transformed from serial language into parallel language are stored for use in the data processing device, such as a computer.

The signal converter is provided with a special unit, which decides when no more digits are stored on the magnetic tape, whereupon the signal converter is open for reception of the information stored on the tape, reading the last digits stored on the first tape and driving the tape in opposite direction compared to the one it had when the information was recorded thereon.

The signal converter is further provided with an error indicating device arranged to indicate if information bits simultaneously appear in the two channels of the magnetic tape. As mentioned above, the code build up is of a type such that each digit bit in one channel shall have its counterpart in the form of a non-digit bit in the other channel. This error indication device will, of course, not be operative for the control bits which, as mentioned above, appear simultaneously in the two channels.

The characteristics of a signal converter according to the invention will now be described more in detail with reference to the accompanying drawing.

In the drawing a circuit diagram for a signal converter is illustrated, a pulse diagram also being inserted, in which the types of pulse in different positions of the circuit diagram are shown, the types of pulse carrying the same letters appearing at the corresponding places in the circuit diagram.

The function of the signal converter will now be described, and from the description the structure of the electrical circuits for the same will also become schematically evident. Some of said circuits have only been indicated as block symbols, because their detailed structure is of no particular importance in the present connection.

As has been indicated above, the signal carrier is, for example, a magnetic tape having two information-carrying channels, namely an information channel and a synchronizing channel. The first mentioned channel is indicated by KB and the other channel is indicated by KA appearing in the left top portion of the circuit diagram, as well as in the pulse diagram. The coding system is of such nature that each digit is built up by a certain number of bits, in the example four digit bits and one control bit, the code composition being such that the code element bits are represented in the information channel and the inverse code element bits are represented in the synchronizing channel. The control bit is represented as an information bit in both channels simultaneously and constitutes a digit start signal which simultaneously appears in channel KA and channel KB.

In the example it is intended that the reading of the magnetic tape shall place in such a manner that the reading portion, of which only the magnetic heads 1,2 and amplifiers 3,4 are illustrated in the drawing, at the start of the signal converter winds the tape until a signal end unit 18 finds the last information bit registered on the tape, and the reading of the tape thus begins with the last digit and successively continues until the first digit recorded on the tape is reached.

Box 18 in the drawing represents the signal end unit, which operates in response to the last information bit recorded on the tape. This signal end unit senses the tape from its end in the direction opposite to the direction of movement during the recording of the information and functions as an OR-gate.

When the signal end unit or OR-circuit 18 has found the last information bit recorded on the tape it emits a constant signal to one of the inputs of the AND-gates 5,6, said gates being prepared for reception of the digit bits from the magnetic heads 1,2, which sense the information channel KB and the synchronizing channel KA, respectively, via amplifiers 3 and 4. The signal configurations at the top of the pulse diagram correspond to a FIG. 2 marked on the tape, whereby it is evident that the digit comprises a starting pulse in channel KA and in channel KB, a digit pulse bit on the bit position No. 2 in channel KB and inverse digit pulse bits on the bit position No.

1,3 and 4 in channel KA. The third and fourth lines of the pulse diagram show, on an enlarged scale compared with the first two lines, the pulses which correspond to the start signal and which are indicated with A and B, respectively, as they appear at the outputs from the AND-gates 6 and 5, respectively.

The channel bit signals open the gates 5 and 6, which, as mentioned, have been prepared by the constant signal from the signal end unit 18. The pulses A and B are fed to an AND-gate 7, resulting in said gate emitting an output signal to a front edge differential analyzer 9, which in turn starts a monostable flip-flop 10, which emits the pulse C starting simultaneously with the front edge of the pulses A and B. The pulse C is fed to a rear edge differential analyzer 11, which in turn starts a monostable flip-flop 12, emitting the pulse D, which starts simultaneously with the rear edge of the pulse C (see the pulse diagram). The pulse D is fed to a rear edge differential analyzer 13, which in turn starts a monostable flip-flop 14, which emits the pulse E, which starts simultaneously with the rear edge of the pulse D.

The pulse D is fed to a synchronizing chain 22 with six steps and re-sets said chain. The pulse E is fed to the synchronizing chain 22 and one-sets the step No. 1 in said chain.

The pulses A and B are fed from the gates 5,6 also to an OR-gate 19, which emits a signal to a rear edge differential analyzer 20, which starts the flip-flop 21, which in turn emits the pulse F to the synchronizing chain 22. The pulse F starts, as is evident from the pulse diagram, at the rear edge of the pulses A and B and steps forward the No. one stored by the pulse E in the step No. 1 of the chain 22 to the step No. 2. This having taken place, step No. 2 emits a signal to the AND-gate 24 connected therewith, but said gate does not let through any signal, its other input signal from gate 5 being zero, because of the channel KB in the first bit position lacking signal. However, the corresponding pulse in the channel KA does give a signal F to the synchronizing chain 22 via the gate 19, the differential analyzer 20 and the flip-flop 21, so that the No. one now present in step No. 2 of said chain is stepped forward to step No. 3.

The last mentioned step No. 3 emits an input signal to the AND-gate 25 and, since in the bit position 2 in the channel KB a pulse is present, said gate 25 receives its second input signal, so that emits a signal at its output to the corresponding flip-flop among the flip-flops 28–31. Analogous to pulse A in the first bit position, pulse B in the second bit position also emits a pulse F for stepping forward the No. one in step No. 3 to step No. 4. in the synchronizing chain 22 via the devices 19, 20, 21.

For the third and fourth bits of the digit, viz. no pulse in the corresponding bit positions in channel KB, the effect will be the same as for the first bit.

Once all the bits, which have been fed in series to the signal converter, have passed the synchronizing chain and the gates 24–27, they then are represented in parallel configuration in the flip-flops 28–31, i.e. in the present case as 0–1–0–0 corresponding the signal fed into channel KB. Thus input signal for AND-gates 32–35 is also connected to flip-flops 28–31 (here signal only to 33).

The fourth bit of the fed in digit transmits, as is easily understood, the No. one, which by the third bit has been introduced into the step No. 5 in the synchronizing chain 22, to step No. 6 in said chain. The flip-flop 23 then in its one-setting emits a preparation signal to the reading unit 40, so that a reading control thereby is provided, which means that the digit stored in the storage flip-flops has been introduced in the signal converter in the correct manner. Reading unit 40 is an AND-circuit having two inputs, from 23 and terminal 17, respectively, and three outputs, to 28 to 31, 32 to 35, and 36 to 39, respectively.

The data processing device to which the signal converter is connected via terminals 8 and terminal 17, decides when reading shall take place. When reading unit 40 receives a reading signal at terminal 17 from said device, the AND-condition is fullfilled for those of gates 32–35, which have received a signal at their second input from flip-flops 28–31, i.e., in the present case only for the gate 33, whereby the corresponding flip-flop 36–39 is set, i.e., here only flip-flop 37.

The signals from flip-flops 36–39 are re-coded to the desired language in re-coder 41 and are via the gates 42 fed in parallel to the data processing device (not shown). The gate unit 42 may instead be arranged for serial output, then having only one output 8.

The flip-flops 28–31 are re-set from the reading unit 40 when the conditions for the gates 32 – 35 are fulfilled, whereupon the next digit on the magnetic tape can be fed to the signal converter. As shown, flip-flops 36–39 are re-set from reading unit 40 in a corresponding manner.

If, during the input operation in the signal converter, information should appear in both the channels KA and KB in any one of the four bit positions, the device functions in the following manner for indicating the error: When an output signal is received from the step No. 2 in the synchronizing chain 22 the reading flip-flop 23 is re-set, which fullfills one of the conditions for the AND-gate 15. If during the forward stepping of chain 22, the pulse C appears, i.e., if a pulse is received simultaneously in channel KA and channel KB, the second condition is fulfilled for gate 15, which then emits a signal to the error flip-flop 16 in order to obtain an error indication. The same result is obtained when there are corresponding errors in other bit positions. When the error consists of no information simultaneously in both channels, the chain 22 cannot be stepped forward to the end step No. 6 and then the reading unit 40 will be blocked, so that no reading can take place. Errors of other types than those dealt with here can produce error indications in accordance with what usually can happen elsewhere in the electronics engineering practice.

As has been indicated above, the invention is not limited to the embodiment described and illustrated in the drawing, but can be modified in different ways within the scope of the accompanying claims.

What we claim is:

1. In a signal converter for reading of information recorded on magnetic tape and for conversion of said information to a language suitable for punched tape, data tape, data communication or the like where the magnetic tape comprises two information carrying channels, one of which contains digit bits and the other the corresponding inverse digit bits, and each digit has a control bit which starts the digit, said signal converter comprising

- a magnetic tape reader for successive reading of the bits in the channels,
- a digit store with a number of locations for parallel storage of a digit, which number corresponds to the number of digit bits per digit,
- a code transformer for re-coding the stored information to the suitable code language, and
- a reading unit for the release of each one of the digits thus re-coded, the improvement which resides in that said signal converter comprises

- a synchronizing chain connected between the reader and the digit store and provided with a starting step,
- a number of intermediate steps corresponding to the number of digit bits per digit,
- an end step,
- where the control bit, which is simultaneously recorded in both channels mentioned, is arranged partly to re-set the chain and partly to one-set the first intermediate step of said chain when reading the first digit bit, said digit bits and said inverse digit bits being arranged to successively one-set the successive steps of the chain,
- and a number of gates corresponding to the number of intermediate steps with one input connected to the corresponding intermediate step and another input connected for being fed from the channel containing the digit bits, whereby each respective gate is opened for each digit bit in order to transmit said bit to the location in the digit store which corresponds to its position.

2. A signal converter according to claim 1, further comprising a differential analyzer which is controlled by one of the control bits and arranged to control a monostable flip-flop which is connected to the steps in the synchronizing chain for re-setting of said steps.

3. A signal converter according to claim 1, further comprising a differential analyzer controlled by one of the control bits and arranged to control a monostable flip-flop, which is connected with the starting step of the synchronizing chain for one-setting of said step.

4. A signal converter according to claim 1, further comprising an OR-gate fed with the digit bits and the inverse digit bits, which gate is arranged to control a differential analyzer, which feeds a flip-flop, which is connected with the synchronizing chain for one-setting of a step of said chain.

5. A signal converter according to claim 1, wherein the end step in the synchronizing chain is connected with the reading unit in order to prepare said unit for reading when said step has been one-set.

6. A signal converter according to claim 5 wherein the first intermediate step of the synchronizing chain is connected with an AND-gate, which has a second input fed from a flip-flop, which is controlled by a differential analyzer, which is excited when both the channels simultaneously contain a digit bit, whereby said gate is arranged to provide an error indication.

7. A signal converter according to claim 1, further comprising a signal end unit arranged to open the converter for function when an input signal from both the channels is missing during a certain time interval, the reader being arranged to drive the tape for reading in a direction opposed to the direction of recording.

* * * * *

PO-1050
(5/69)

UNITED STATES PATENT OFFICE
CERTIFICATE OF CORRECTION

Patent No. 3,670,146 Dated June 13, 1972

Inventor(s) GILL GUNNAR SODERSTROM, BERTIL NILSSON and NILS EVERT JOHAN STAHL

It is certified that error appears in the above-identified patent and that said Letters Patent are hereby corrected as shown below:

Col. 2, line 7, "open" should read --opened--;
" ", line 9, "first tape" should read --tape first--;
" ", line 53, insert --take-- before "place".

Col. 3, line 29, erase "No.";
" ", line 30, erase "the" (third occurrence);
" ", line 37, erase "No.";
" ", line 43, insert --it-- before "emits";
" ", line 46, erase "No.";
" ", line 60, erase "No.".

Signed and sealed this 10th day of April 1973.

(SEAL)
Attest:

EDWARD M.FLETCHER,JR.
Attesting Officer

ROBERT GOTTSCHALK
Commissioner of Patents